US012560714B2

(12) United States Patent
Mulligan et al.

(10) Patent No.: US 12,560,714 B2
(45) Date of Patent: Feb. 24, 2026

(54) UNMANNED AERIAL VEHICLE WITH UNDERWATER SONAR SCANNING CAPABILITY

(71) Applicant: HYDRONALIX, INC., Green Valley, AZ (US)

(72) Inventors: Anthony C. Mulligan, Sahuarita, AZ (US); Jaime Lara-Martinez, Tucson, AZ (US); Drey Platt, Sahuarita, AZ (US); Dylan Gutierrez, Tucson, AZ (US); Eva Huie, Tucson, AZ (US)

(73) Assignee: Hydronalix, Inc., Green Valley, AZ (US)

( * ) Notice: Subject to any disclaimer, the term of this patent is extended or adjusted under 35 U.S.C. 154(b) by 0 days.

(21) Appl. No.: 17/329,965

(22) Filed: May 25, 2021

(65) Prior Publication Data

US 2022/0380043 A1     Dec. 1, 2022

(51) Int. Cl.

| | |
|---|---|
| *G01S 15/89* | (2006.01) |
| *B64U 10/14* | (2023.01) |
| *B64U 20/40* | (2023.01) |
| *B64U 50/27* | (2023.01) |
| *B64U 50/31* | (2023.01) |
| *B64U 60/10* | (2023.01) |

(Continued)

(52) U.S. Cl.
CPC .......... *G01S 15/8902* (2013.01); *B64U 10/14* (2023.01); *B64U 20/40* (2023.01); *B64U 50/27* (2023.01); *B64U 50/31* (2023.01); *B64U 60/10* (2023.01); *B64U 60/30* (2023.01); *B64U 2101/32* (2023.01)

(58) Field of Classification Search
CPC ... B64C 39/024; B64D 47/08; G01S 15/8902; B64U 2101/30
See application file for complete search history.

(56) References Cited

U.S. PATENT DOCUMENTS

| | | |
|---|---|---|
| 2,973,169 A | 2/1961 | Handler |
| 3,967,232 A | 6/1976 | Mills et al. |
| | (Continued) | |

FOREIGN PATENT DOCUMENTS

| | | | | |
|---|---|---|---|---|
| CN | 112180380 A | * | 1/2021 | |
| CN | 112478067 A | * | 3/2021 | ............. B63B 35/00 |
| | (Continued) | | | |

OTHER PUBLICATIONS

Various, "Skeg", Jan. 2021, Wikipedia. https://en.wikipedia.org/w/index.php?title=Skeg&oldid=1003291767, all pages (Year: 2021).*
(Continued)

*Primary Examiner* — Kenneth M Dunne
(74) *Attorney, Agent, or Firm* — Womble Bond Dickinson (US) LLP

(57) ABSTRACT

An unmanned aerial system includes an unmanned aerial vehicle having a body and a primary propulsion system coupled to the body. The primary propulsion system includes at least one propeller and at least one motor coupled to the at least one propeller. The unmanned aerial system also includes a pair of landing gears coupled to the body of the unmanned aerial vehicle. Each landing gear of the pair of landing gears includes a buoyant elongated float. The unmanned aerial system also includes a SONAR device coupled to the unmanned aerial vehicle.

21 Claims, 11 Drawing Sheets

(51) Int. Cl.
    *B64U 60/30*         (2023.01)
    *B64U 101/32*      (2023.01)

(56)         References Cited

U.S. PATENT DOCUMENTS

| | | | |
|---|---|---|---|
| 4,236,234 | A | 11/1980 | McDavid et al. |
| 4,422,166 | A * | 12/1983 | Klein ...................... G01S 15/86 |
| | | | 367/106 |
| 4,561,076 | A * | 12/1985 | Gritsch ................. G01S 15/003 |
| | | | 367/106 |
| 4,641,290 | A | 2/1987 | Massa et al. |
| 7,149,147 | B1 | 12/2006 | Goldman et al. |
| 7,532,541 | B2 | 5/2009 | Govindswamy et al. |
| 9,400,338 | B2 | 7/2016 | Coste et al. |
| 10,324,210 | B2 | 6/2019 | Coates et al. |
| 10,427,789 | B2 | 10/2019 | Gan |
| 2006/0228959 | A1* | 10/2006 | Ruiz ..................... B63H 11/113 |
| | | | 114/61.1 |
| 2010/0044506 | A1* | 2/2010 | Smith ..................... B64C 25/10 |
| | | | 244/101 |
| 2011/0004367 | A1* | 1/2011 | Saunders .................. B63B 5/24 |
| | | | 114/268 |
| 2013/0215719 | A1* | 8/2013 | Betts ....................... G01S 15/89 |
| | | | 367/88 |
| 2014/0090288 | A1* | 4/2014 | Freeman ................ A01K 93/00 |
| | | | 43/26.1 |

| | | | |
|---|---|---|---|
| 2016/0214717 | A1 | 7/2016 | De Silva |
| 2018/0044000 | A1* | 2/2018 | Venturelli ............. B64C 25/405 |
| 2018/0155016 | A1* | 6/2018 | Tian ........................ B64C 27/20 |
| 2018/0194484 | A1* | 7/2018 | Livieratos ............. B64D 27/24 |
| 2018/0284575 | A1* | 10/2018 | Sugaki ................... G03B 17/08 |
| 2019/0039427 | A1* | 2/2019 | Hartshorn ................ C25B 1/55 |
| 2019/0137270 | A1* | 5/2019 | McArthur ............... G01N 1/10 |
| 2019/0258139 | A1* | 8/2019 | Overall ................ B64C 39/024 |
| 2020/0055577 | A1* | 2/2020 | Shoemake ......... G01N 33/0036 |
| 2020/0258400 | A1* | 8/2020 | Yuan ................... G06F 18/2413 |
| 2020/0333787 | A1* | 10/2020 | Corbieres .............. G01S 15/96 |
| 2022/0111958 | A1* | 4/2022 | Tian ..................... B64C 39/024 |
| 2022/0404328 | A1* | 12/2022 | Reisfeld ............... B64C 39/024 |

FOREIGN PATENT DOCUMENTS

| | | | | |
|---|---|---|---|---|
| FR | 3026569 | A1 * | 4/2016 | ........ G10K 11/0083 |
| JP | 2021049985 | A * | 4/2021 | |
| KR | 2015140172 | A * | 12/2015 | |
| WO | WO-2016141447 | A1 * | 9/2016 | ............ B64C 25/06 |

OTHER PUBLICATIONS

Machine translation of KR 20150140172 A, 2015, Espacenet (Year: 2015).* https://www.aguadrone.com/, 6 pages, last accessed May 20, 2021.

Hiller, "Taking to the Skies," ON&T, 2 pages, Mar. 2021.

\* cited by examiner

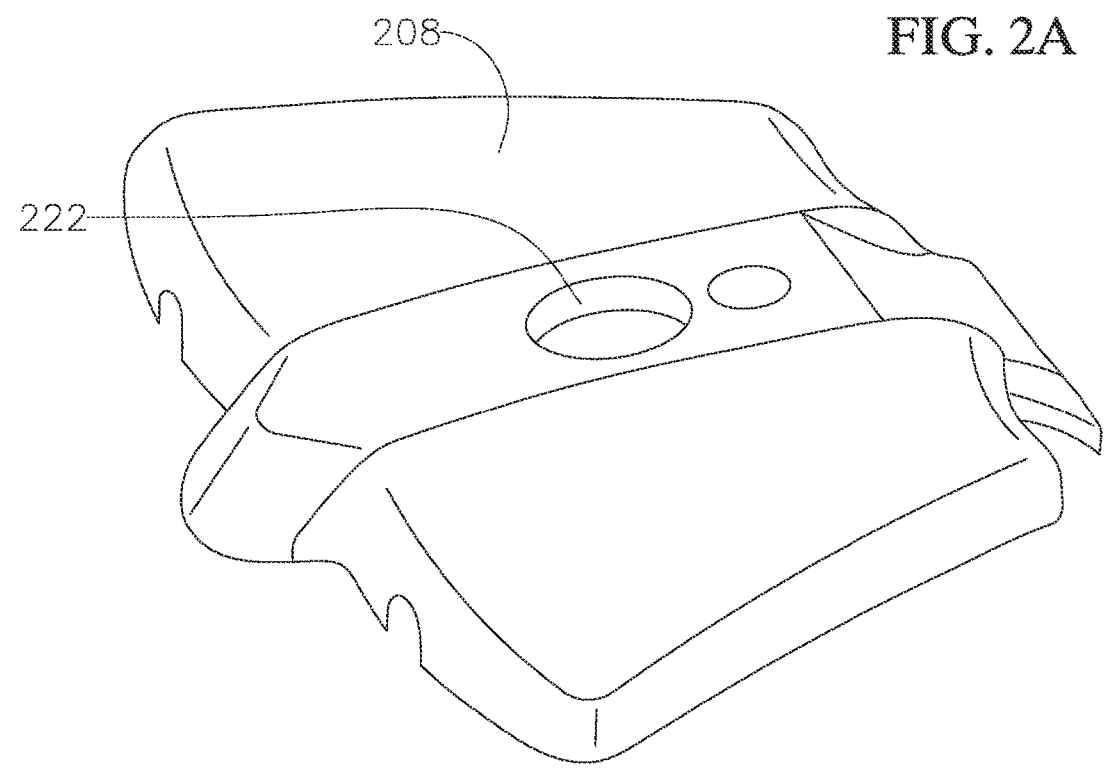
FIG. 2A
FIG. 2B
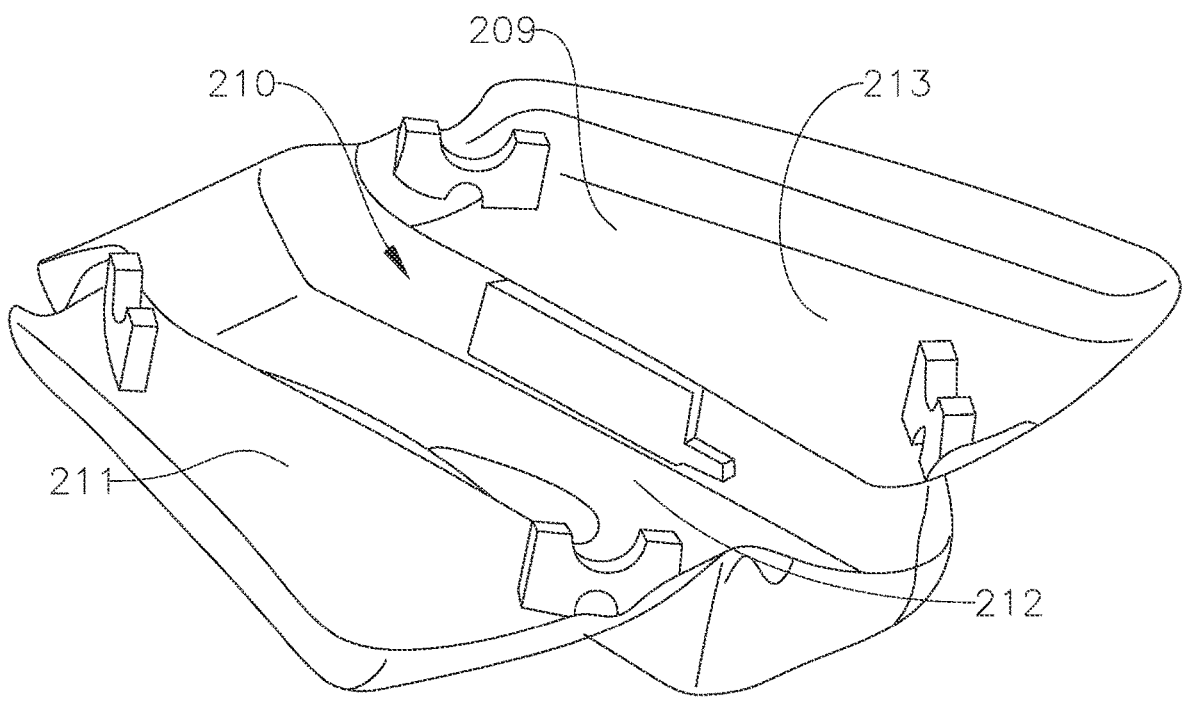

800

START

810
NAVIGATING  UAV  SYSTEM

820
PHOTOGRAPHING  AN  AREA

830
COLLECTING  WEATHER  DATA

840
LANDING  THE  UAV  SYSTEM  ON  A
BODY  OF  WATER

850
SCANNING  THE  BODY  OF  WATER
WITH  A  SONAR  DEVICE

860
PROPELLING  THE  UAV  DEVICE  ALONG  THE
SURFACE  OF  THE  BODY  OF  WATER

870
IDENTIFY  ONE  OR  MORE
THINGS  OF  INTEREST

880
DETERMINE  WATER  CARRYING  CAPACITY
OF  THE  BODY  OF  WATER

END

UNMANNED AERIAL VEHICLE WITH UNDERWATER SONAR SCANNING CAPABILITY

STATEMENT REGARDING FEDERALLY SPONSORED RESEARCH OR DEVELOPMENT

This invention was made with U.S. Government support under Grant No. NA20OAR0210326 awarded by the NOAA. The U.S. Government has certain rights in the invention.

BACKGROUND

1. Field

The present application relates generally to unmanned aerial vehicles.

2. Description of the Related Art

Unmanned aerial vehicles (i.e., drones) are increasingly being utilized to assist in disaster relief efforts. The use of unmanned aerial vehicles enables access to areas (e.g., roadways or waterways) that would be inaccessible by land vehicles, for example, due to damaged and/or obstructed roadways, and inaccessible by maritime vessels, for example, due to obstructed channels, ports, or other waterways. However, related art unmanned aerial vehicles are limited to aerial assessments, such as photographing surface devastation due to flooding or a hurricane event. These related art unmanned aerial vehicles are not capable of analyzing underwater structures, such as to detect hazardous debris in waterways or to detect bodies that are trapped in submerged debris. Moreover, digital elevation maps (DEMs) generated from high altitude aircraft can only partially help estimate the water carrying capacity of rivers, creeks, and other waterways because they are incapable of mapping the underwater topology of the waterway. Thus, DEMs generated by aircraft are not sufficient to perform pre-disaster mitigation (PDM) by accurately predicting flooding before the occurrence of a natural disaster.

Additionally, related art systems for underwater mapping require ground transportation via roadways or transportation by a maritime vessel via waterways, which, as described above, are typically inaccessible or otherwise not traversable following a disaster event. The use of related art underwater mapping systems also typically requires several days to plan logistics and to prepare a team, and this delay may exacerbate infrastructure damage, delay delivery of relief aid, and may increase human casualties.

SUMMARY

The present disclosure relates to various embodiments of an unmanned aerial system. In one embodiment, the unmanned aerial system includes an unmanned aerial vehicle (UAV) having a body and a primary propulsion system coupled to the body. The primary propulsion system includes at least one propeller and at least one motor coupled to the at least one propeller. The unmanned aerial system also includes a pair of landing gears coupled to the body of the unmanned aerial vehicle. Each landing gear of the pair of landing gears includes a buoyant elongated float. The unmanned aerial system also includes a SONAR device coupled to the unmanned aerial vehicle.

The SONAR device may include a 360-degree transducer or a side-scan transducer. The SONAR device may further include a depth finder.

The unmanned aerial system may include a camera coupled to the body of the unmanned aerial vehicle. The camera may be a high-definition electro-optical (EO) camera or an infra-red (IR) camera.

The unmanned aerial system may include a secondary propulsion system coupled to the pair of landing gears. The secondary propulsion system may include a pump having an exit nozzle, and a motor coupled to the pump.

Each elongated float may include an interior cavity having a forward compartment and an aft compartment, and an inlet port and an outlet port in fluid communication with the aft compartment. The forward compartment may house the motor and the aft compartment may house the pump.

The unmanned aerial system may also include a weather station coupled to the unmanned aerial vehicle. The weather station may include an anemometer, a thermistor, a hygrometer, a barometer, a pyranometer, or combinations thereof.

The body of the UAV may define an interior chamber having a series of compartments. The unmanned aerial system may also include a flight controller in one of the compartments and at least one rechargeable battery in another one of the compartments.

Each landing gear may include a skeg or at least one retractable foot.

The pair of landing gears may be detachable from the body, or the pair of landing gears may be configured to move between a deployed configuration and a stowed configuration.

The present disclosure also relates to various embodiments of a method of surveying an environment following a disaster event. In one embodiment, the method includes landing an unmanned aerial vehicle on a surface of a body of water, and scanning the body of water with a SONAR device of the unmanned aerial vehicle to generate an underwater topological map of the body of water.

The method may also include capturing a photograph with a camera of the unmanned aerial vehicle.

The method may further include collecting weather data with a weather station of the unmanned aerial vehicle.

The method may also include propelling the unmanned aerial vehicle along the surface of the water, and side-scanning the water with the SONAR device.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIGS. 2A-2D are a top perspective view of an upper shell, a bottom perspective view of the upper shell, a bottom perspective view of a lower shell, and a top perspective view of the lower shell, respectively, of a body of the embodiment of the unmanned aerial system depicted in FIGS. 1A-1D;

DETAILED DESCRIPTION

Figure 1A:
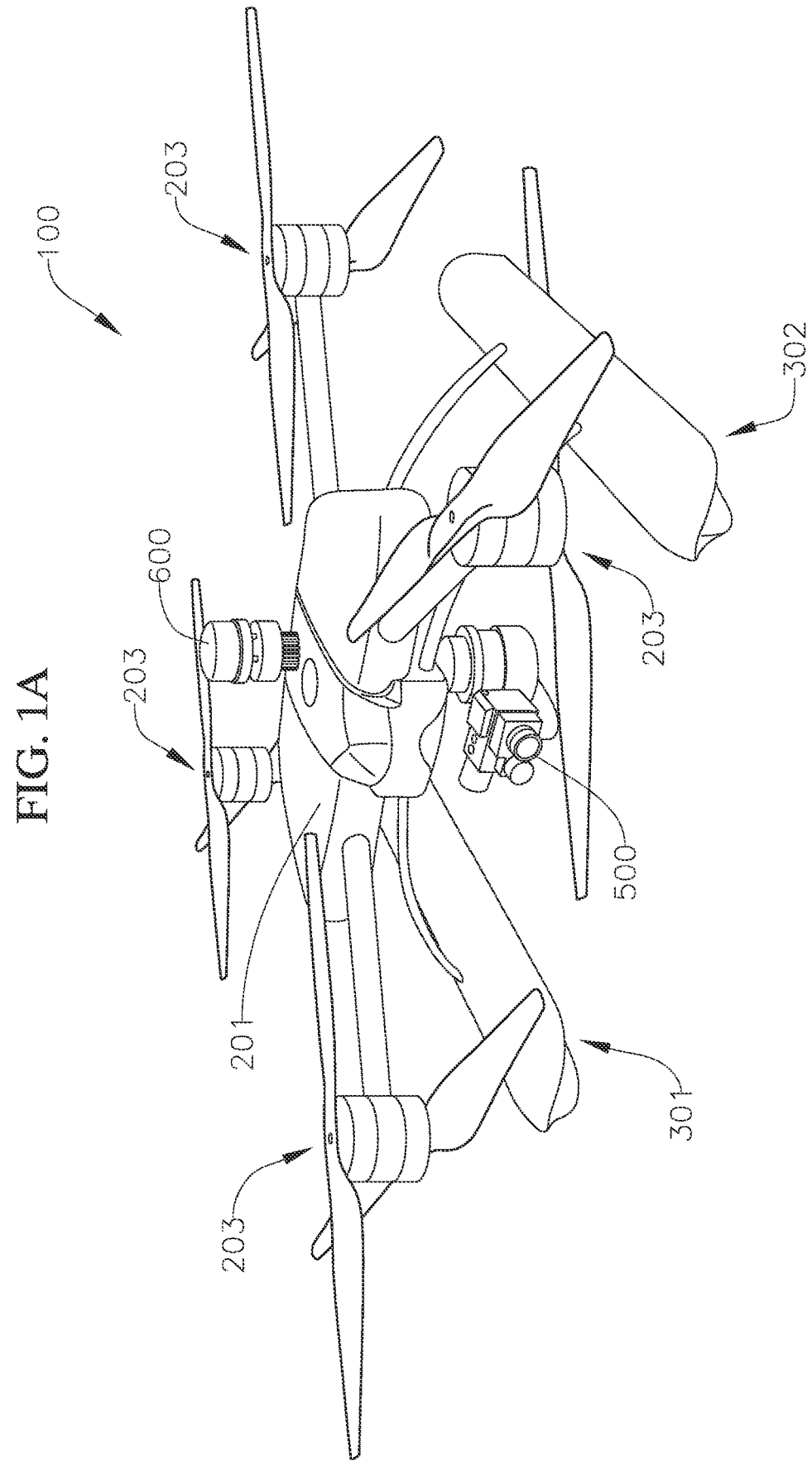
FIGS. 1A-1D are a perspective view, a front view, a top view, and an exploded perspective view, respectively, of an unmanned aerial system according to one embodiment of the present disclosure.
Figure 1B:
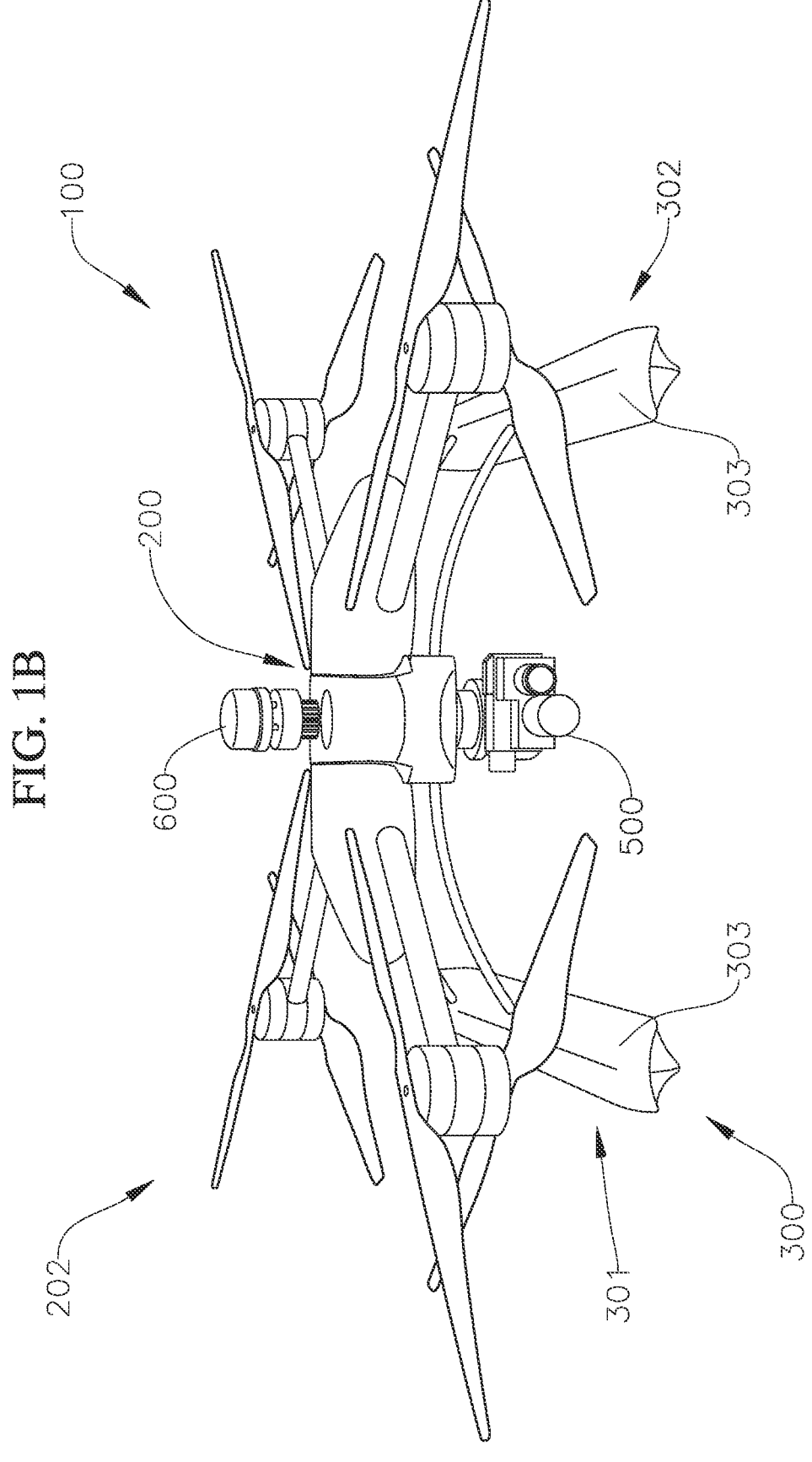
Figure 1C:
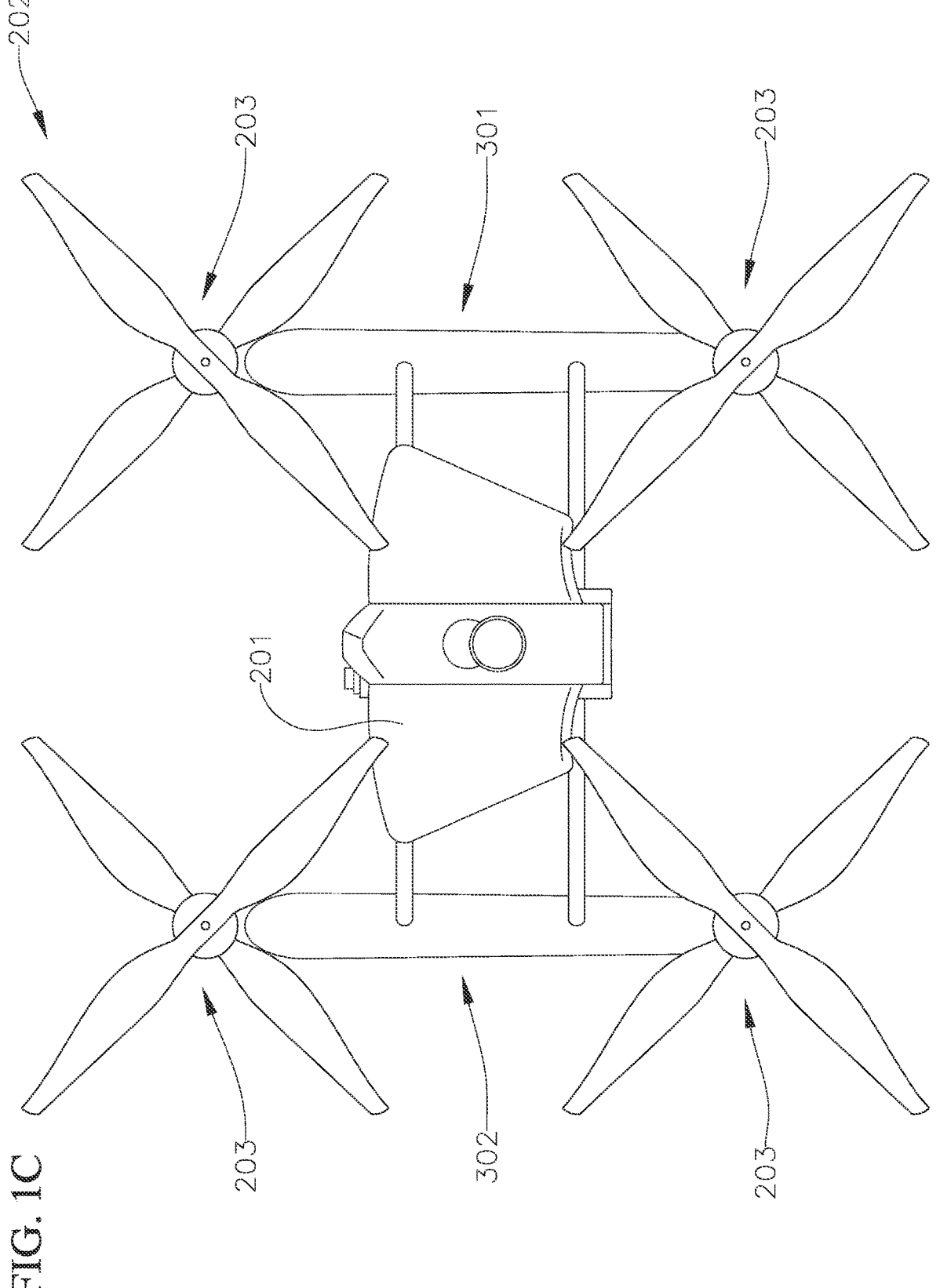
Figure 1D:
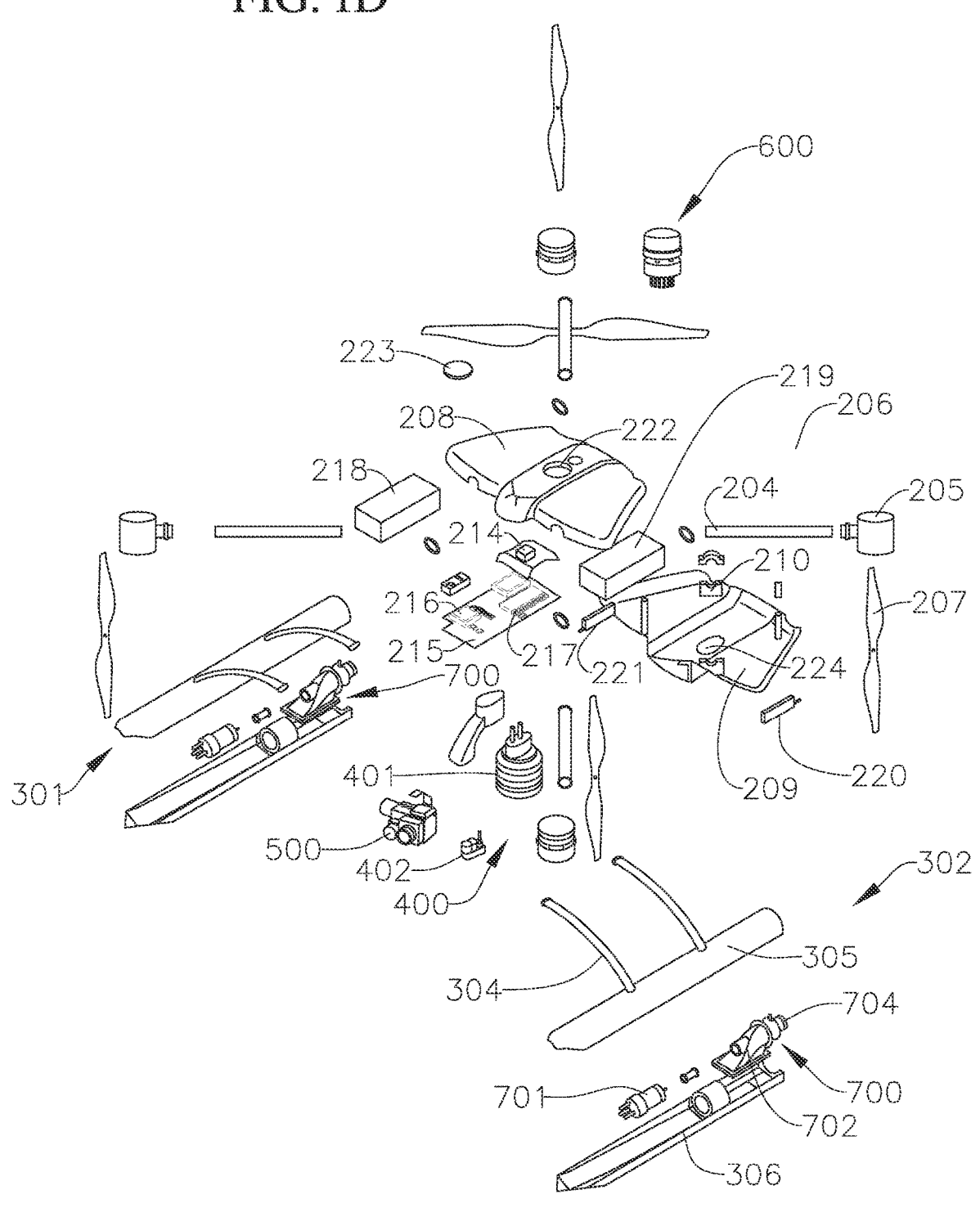
Figure 2C:
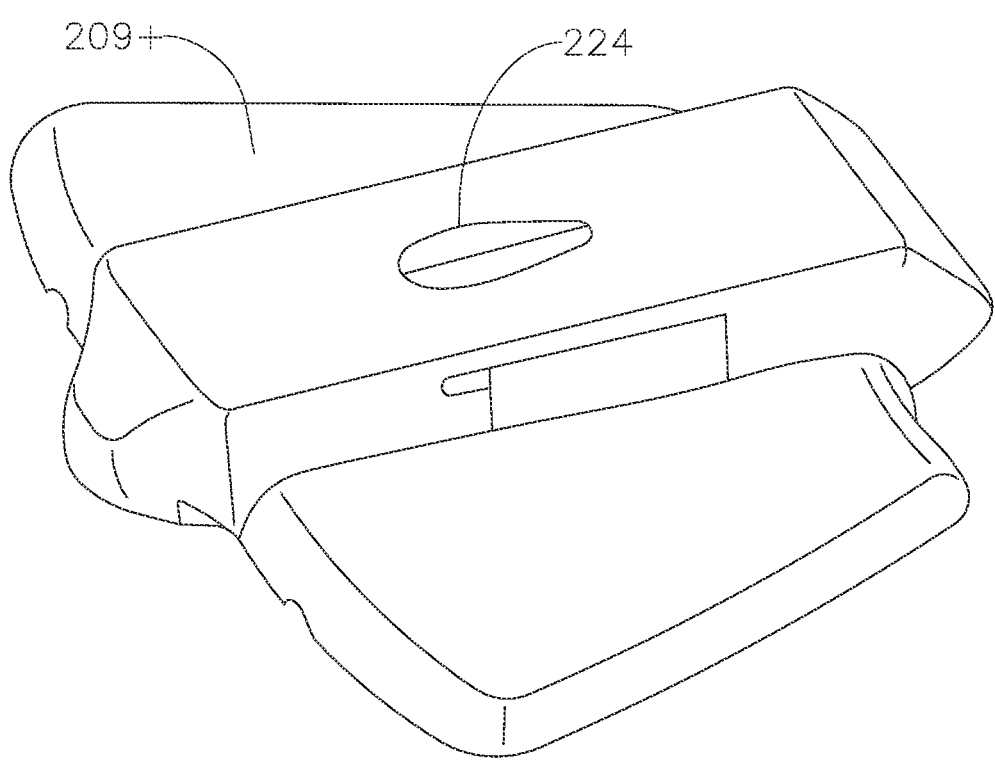
Figure 2D:
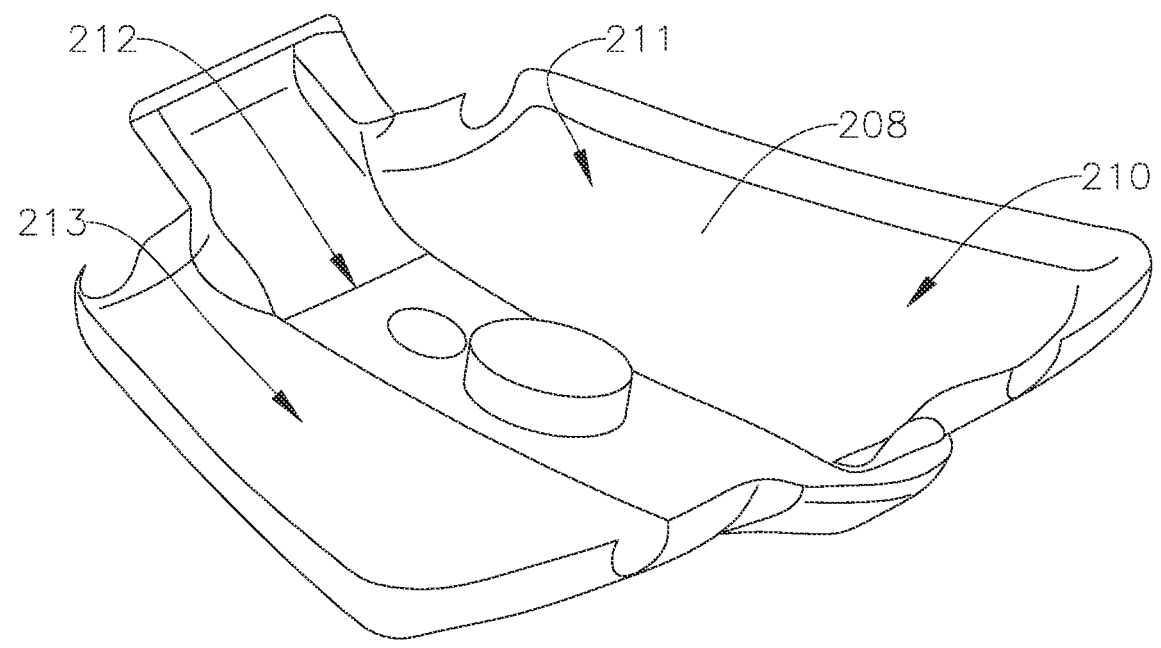

The present application relates to various embodiments of an unmanned aerial vehicle system including a buoyant platform and a SONAR device configured to enable underwater imaging of various waterways. The buoyant platform enables the unmanned aerial vehicle system to land on water and then perform an underwater scan utilizing the SONAR device. The unmanned aerial systems of the present disclosure may be utilized in disaster relief operations, such as damage assessment (e.g., underwater damage assessment and/or assessment of waterway structures, such as bridges and piers), victim identification (e.g., searching for displaced populations and/or individuals), and identification of safe pathways for ships or boats to navigate while delivering needed supplies and/or performing rescue missions. In this manner, the unmanned aerial systems of the present disclosure may be utilized to assist and provide situational awareness to first responder teams in natural disaster relief missions, rescue missions, and/or humanitarian efforts.

With reference now to FIGS. 1A-1D, an unmanned aerial vehicle system 100 according to one embodiment of the present disclosure includes an unmanned aerial vehicle 200 (UAV), a landing gear assembly 300 coupled to the UAV 200 to enable landing the UAV system 100 on land or on water, a SONAR device 400 and a camera 500 coupled to a lower portion of the UAV 200, and a weather station device 600 coupled to an upper portion of the UAV 200. In one or more embodiments, the SONAR device 400 includes a transducer 401 (e.g., a 360-degree transducer or a side-scan transducer) and a depth finder 402 configured to map the underwater topology of a body of water (e.g., a channel, a river, a lake, or the ocean shore). The camera 500 may be any suitable type or kind of camera, such as a high-definition electro-optical (EO) camera or a thermal imaging infra-red (IR) camera.

In the illustrated embodiment, the UAV 200 includes a body 201 and a primary propulsion system 202 coupled to the body 201 to enable flight and navigation of the UAV system 100. In one or more embodiments, the landing gear assembly 300 may be detachable from the body 201 of the UAV 200, or the landing gear assembly 300 may be configured to rotate or otherwise move into a stowed configuration (i.e., the landing gear assembly 300 may be configured to move between a deployed configuration for operation and a stowed configuration for transportation), to facilitate transportation of the UAV system 100 in a compact form. In the illustrated embodiment, the primary propulsion system 202 includes four rotor assemblies 203 arranged around the body 201 of the UAV 200 (e.g., four rotor assemblies 203 equidistantly arranged around the body 201 of the UAV 200), and each rotor assembly 203 includes an arm or a strut 204 extending outward from the body 201 (i.e., a strut 204 having a proximal end coupled to the body 201 and a distal end opposite the proximal end), a motor 205 coupled to the distal end of the strut 204, and a pair of propellers 206 and 207 coupled to a driveshaft of the motor 205 (i.e., an upper propeller 206 coupled to an upper end of the motor 205 and a lower propeller 207 coupled to a lower end of the motor 205). In the illustrated embodiment, each of the motors 205 is a coaxial waterproof motor. The struts 204 space the motors 205 and the propellers 206 and 207 apart from the body 201 of the UAV 200, and also function as a conduit carrying one or more electrical lines (e.g., cables) to supply power and control signals from the body 201 of the UAV 200 to the motors 205 during flight, takeoff, ascent, descent, and landing of the unmanned aerial vehicle system 100. Additionally, in the illustrated embodiment, for each of the rotor assemblies 203, the upper propeller 206 is configured to rotate in an opposite direction than the corresponding lower propeller 207 such that each pair of propellers 206 and 207 imparts a net zero (or substantially net zero) angular momentum to the body 201 of the UAV 200. Although in the illustrated embodiment the UAV 200 is a four rotor aerial vehicle (i.e., a "quad-copter" including four rotor assemblies 203), in one or more embodiments the UAV 200 may be any other suitable type or kind of aerial vehicle (i.e., the UAV 200 may include any other suitable number of rotor assemblies 203).

With reference now to the embodiment illustrated in FIGS. 2A-2D, the body 201 of the UAV 200 includes an upper shell 208 (e.g., an upper cover half) and a lower shell 209 (e.g., a lower cover half) coupled together. Together, the upper shell 208 and the lower shell 209 define an interior chamber 210 (i.e., an interior volume) configured to house the electrical components of various sub-systems of the UAV system 100. Additionally, in the illustrated embodiment, the interior chamber 210 of the body 201 is divided or segmented into a series of compartments 211, 212, 213. Although in the illustrated embodiment the interior chamber of the body is segmented into three compartments 211, 212, 213, in one or more embodiments, the interior chamber 210 may be segmented into any other suitable number of compartments, such as two compartments or more than three compartments. Additionally, in one or more embodiments, the interior chamber 210 of the body 201 may not be segmented into individual compartments. In one or more embodiments, the compartments may be modular compartments (e.g., each of the compartments may be separately removable and detachable from the body 201 of the UAV 200).

In the illustrated embodiment, one of the compartments (e.g., the middle compartment 212) of the body 201 houses flight control hardware (e.g., a flight controller 214) and other electronic components (e.g., a printed circuit board (PCB) 215, a memory device 216, a processor 217, a micro-controller, a system bus, etc.) configured to connect to (or interface with) various sub-systems, such as the SONAR device 400, the camera 500, the weather station 600, and a secondary propulsion system 700 (described in detail below). Additionally, in the illustrated embodiment, one of the compartments (e.g., the left compartment 211) houses a first rechargeable battery 218 (e.g., a 25 V rechargeable lithium polymer (LiPo) battery) and another one of the compartments (e.g., the right compartment 213) houses a second rechargeable battery 219 (e.g., a second 25 V rechargeable LiPo battery). In one or more embodiments, the UAV 200 may include one or more solar cells (e.g., solar panels) on the exterior surface of the upper shell 208 of the body 201 to recharge the first rechargeable battery 218 and/or the second rechargeable battery 219. In the illustrated embodiment, the interior chamber 210 of the body 201 also houses a pair of antennas 220, 221 configured to enable the UAV system 100 to communicate, for example, with a ground station. Furthermore, in the illustrated embodiment, the upper shell 208 of the body 201 includes a recess 222 (e.g., a cylindrical depression) accommodating a Global Positioning System (GPS) device 223 (e.g., a real-time kinematic (RTK) GPS device) on an exterior of the body 201. In one or more embodiments, the compartment (e.g., the middle compartment 212) housing the flight control hardware and other electronic components may be shielded against electro-magnetic interference (i.e., the compartment 212 may include EMI shielding). In one or more embodiments, the interior chamber 210 of the body 201 may include a compartment (e.g., a fourth compartment) defining an interior space configured to house additional cargo or other payloads. In one or more embodiments, the UAV system 100 may have a payload capacity of approximately 42 lbs or greater. Additionally, in the illustrated embodiment, the lower shell 209 includes an opening 224 (e.g., a hole) through which the transducer 401 and the depth finder 402 of the SONAR device 400, and the camera 500, extend up into the compartment 212 and connect to the electronic components (e.g., the printed circuit board 215) housed in the compartment 212.

In one or more embodiments, the antennas 220, 221 of the UAV system 100 are configured to enable the UAV system 100 to transmit information (e.g., data, such as SONAR images and GPS data indicating the geographic coordinates of the UAV system 100) to the "cloud," and to receive instructions from the network cloud. For instance, the instructions received from the cloud may cause the UAV system 100 to activate the SONAR device 400 and/or the camera 500, and/or may cause the UAV system 100 to navigate to a waypoint (e.g., specified geographic coordinates). In one or more embodiments, the UAV system 100 may be configured to communicate with a ground station via the antennas 220, 221.

Figure 3A:
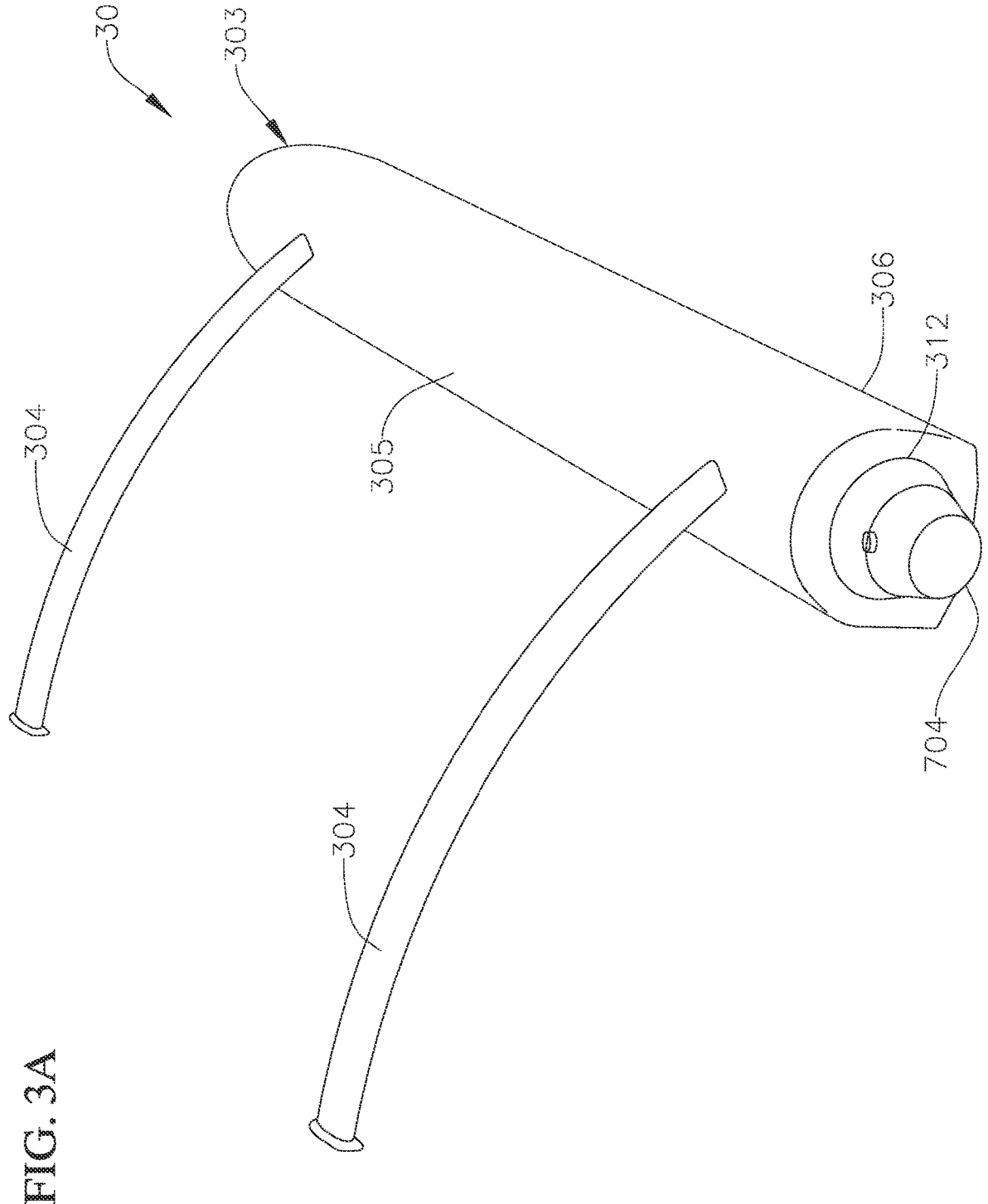
FIGS. 3A-3B are a rear perspective view and an exploded perspective view, respectively, of a landing gear of the embodiment of the unmanned aerial system depicted in FIGS. 1A-1D.
Figure 3B:
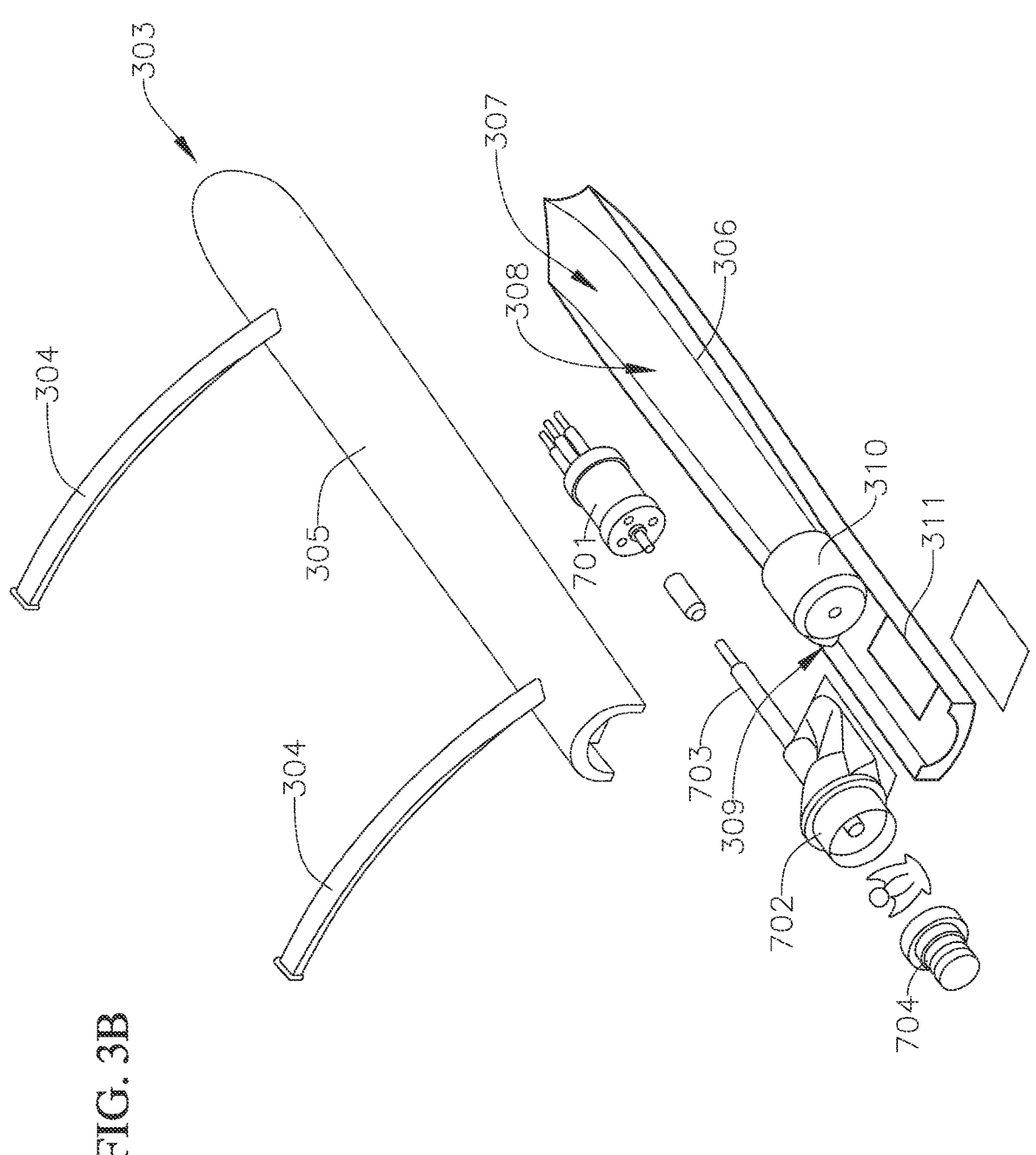

With reference now to the embodiment illustrated in FIGS. 3A-3B, the landing gear assembly 300 includes a pair of landing gears 301 and 302 coupled to opposite sides of the body 201 of the UAV 200. Each of the landing gears 301 and 302 includes an elongated float 303 coupled to the body 201 of the UAV 200 by at least one arm or strut 304 (e.g., a first elongated float and a second elongated float separated from the first elongated float and extending downward and outward from the body 201). Together, the floats 303 of the landing gears 301 and 302 define a buoyant platform configured to enable the UAV system 100 to land and float on a body of water. In the illustrated embodiment, the elongated floats 303 of the landing gears 301 and 302 are parallel (or substantially parallel) to each other, and the elongated floats 303 extend along a direction in which the UAV system 100 is configured to traverse while floating on a body of water.

In the illustrated embodiment, the SONAR device 400 is positioned between the elongated float 303 of the first landing gear 301 and the elongated float 303 of the second landing gear 302. In one or more embodiments, the SONAR device 400 may be located at a center-of-gravity of the unmanned aerial vehicle such that the weight of the SONAR device 400 does not affect the in-flight stability of the UAV system 100 or the stability of the UAV system 100 while floating on water. In one or more embodiments, the buoyant platform may have any other suitable configuration, such as an annular member (e.g., a ring), and the SONAR device 400 may be positioned in an interior of the annular member (e.g., the SONAR device 400 may be surrounded by the annular member of the buoyant platform).

Additionally, in the illustrated embodiment, each of the elongated floats 303 includes an upper shell 305 (e.g., an upper cover half) and a lower shell 306 (e.g., a lower cover half) coupled together. In one or more embodiments, each of the elongated floats 303 may have a generally tubular shape. Together, the upper shell 305 and the lower shell 306 of each of the elongated floats 303 defines an interior chamber 307. Additionally, in the illustrated embodiment, the interior chamber 307 of each of the elongated floats 303 is segmented or divided into a front compartment 308 and an aft compartment 309. In the illustrated embodiment, the interior chamber 307 of each of the floats 303 houses the secondary propulsion system 700. In the illustrated embodiment, the front compartment 308 of the elongated float 303 houses a motor 701 of the secondary propulsion system 700, and the aft compartment 309 houses a pump 702 of the secondary propulsion system 700. The motor 701 is operably coupled to the pump 702 by a drive shaft 703 passing through a partition 310 between the front compartment 308 and the aft compartment 309. The front compartment 308 may be water-tight (or substantially water-tight) to preserve the buoyancy of the elongated float 303 (i.e., the front compartment 308 contains a pocket of air that supplies buoyancy) and to protect the motor 701 against corrosion or other water damage.

Additionally, in the illustrated embodiment, the lower shell 306 includes an inlet port 311 (i.e., an opening) in fluid communication with the aft compartment 309. Furthermore, in the illustrated embodiment, the upper shell 305 and the lower shell 306 together define an outlet port 312 (i.e., an opening) in fluid communication with the aft compartment 309. In the illustrated embodiment, an exit nozzle 704 of the secondary propulsion system 700 coupled to the pump 702 extends through the outlet port 312 of the elongated float 303.

In one or more embodiments, the power for powering the motors 701 may be supplied by one or more batteries in the floats 303 (e.g., in the front compartment 308), or the power may be supplied from one of the rechargeable batteries 218, 219 in the body 201 of the UAV 200 (e.g., for the secondary propulsion system 700 in each of the landing gears 301 and 302, power may be supplied to the motor 701 from one of the rechargeable batteries 218, 219 in the body 201 of the UAV 200 through one of the struts 304 of the landing gear 301 or 302).

In one or more embodiments, the elongated float 303 of each of the landing gears 301 and 302 may include a skeg or one or more actuated feet configured to enable the UAV system 100 to land on the ground.

Figure 4:
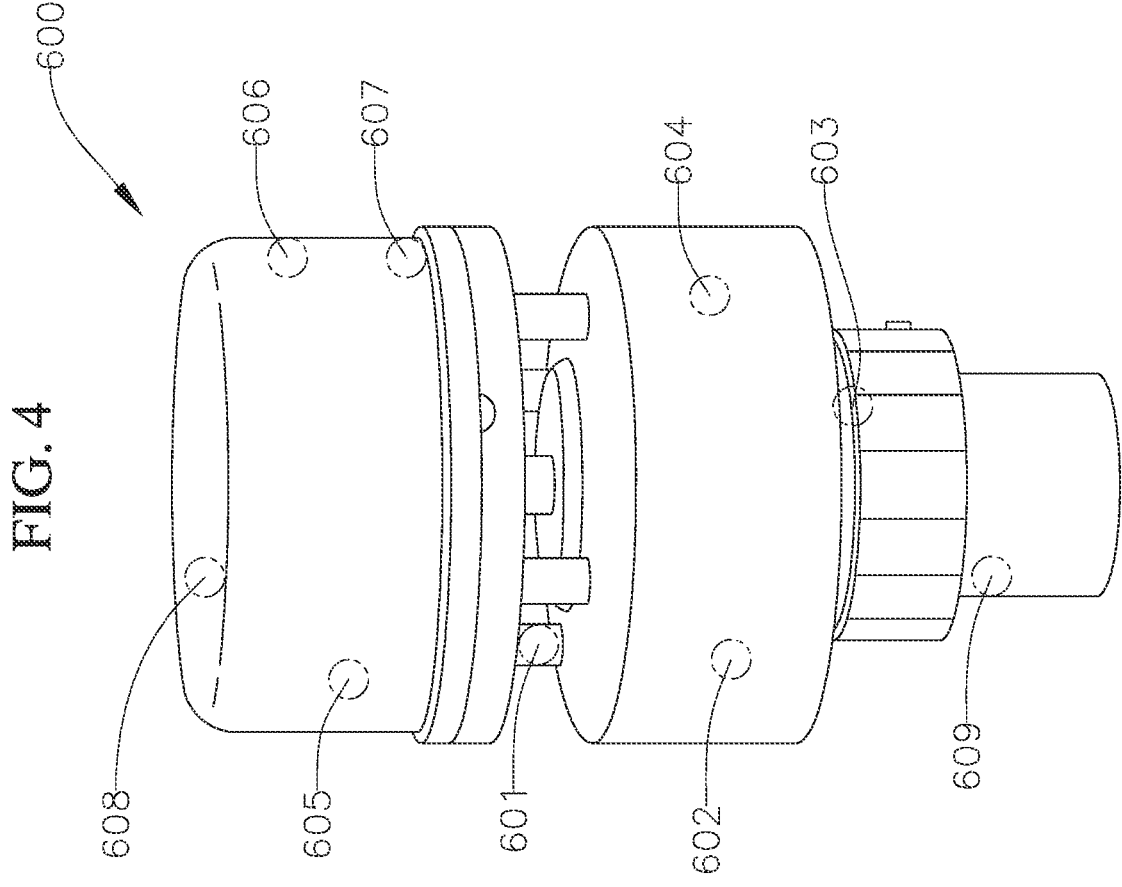
FIG. 4 is a perspective view of a weather station of the embodiment of the unmanned aerial system depicted in FIGS. 1A-1D.

With reference now to the embodiment illustrated in FIG. 4, the weather station 600 of the UAV system 100 includes a series of ultrasonic transducers 601 configured to measure wind speed and direction (i.e., an anemometer), a thermistor 602 configured to measure atmospheric temperature, a relative humidity sensor 603 configured to measure the relative humidity of the atmosphere (i.e., a hygrometer), and a barometric pressure sensor 604 configured to measure atmospheric pressure (i.e., a barometer). In one or more embodiments, the weather station 600 may also include a pyranometer configured to measure solar radiation. In the illustrated embodiment, the weather station 600 also includes a 3-axis accelerometer 605, a 3-axis compass 606, a 3-axis gyroscope 607, and a GPS device 608 configured to measure or determine the position, altitude, and heading of the UAV system 100. Accordingly, the weather station 600 is configured to associate the atmospheric conditions measured by the UAV system 100 (e.g., wind speed and direction, temperature, relative humidity, and atmospheric pressure) with the position, altitude, and heading of the UAV system 100. In one or more embodiments, the weather data collected by the weather station 600 of the UAV system 100 may be transmitted to the network cloud through a satellite constellation system (e.g., directly through the Short Burst Data™ satellite texting system using the Iridium™ satellite constellation). In one or more embodiments, the weather station 600 may include an onboard power supply 609 (e.g., a 12V DC supply current from a rechargeable battery), although in one or more embodiments the power may be supplied by one of the batteries 218, 219 in the body 201 of the UAV 200.

Figure 5:
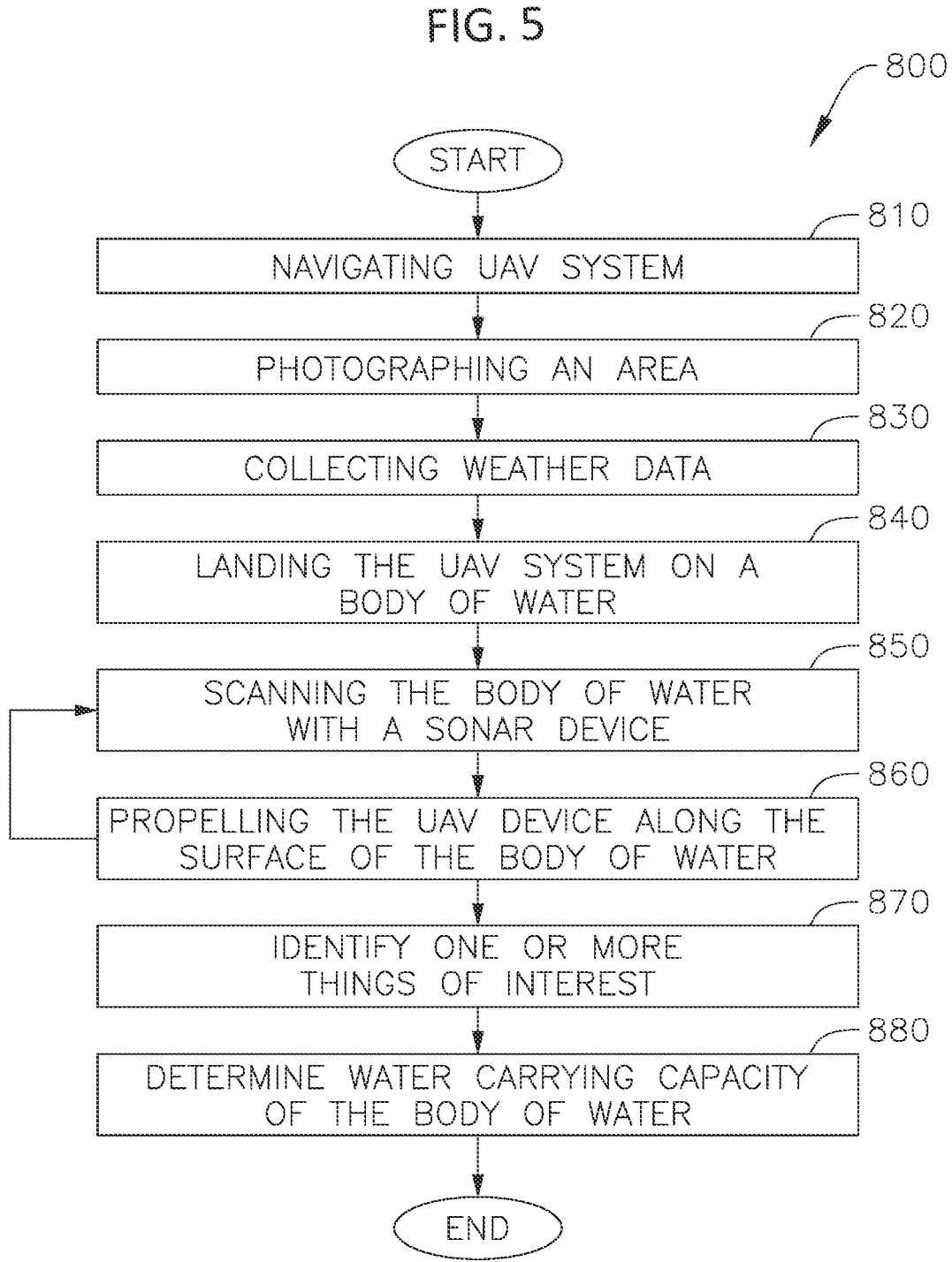
FIG. 5 is a flowchart illustrating tasks of a method of surveying a disaster area utilizing the unmanned aerial system of FIGS. 1A-1D according to one embodiment of the present disclosure.

FIG. 5 is a flowchart illustrating tasks of a method 800 of surveying an environment following a disaster event (e.g., a flood) utilizing the UAV system 100. In the illustrated embodiment, the method 800 includes a task 810 of navigating the UAV system 100. In one or more embodiments, commands may be transmitted to the UAV system 100 (e.g., via a ground station to the antennas 220, 220 of the UAV 200) to cause the UAV system 100 to fly to and/or around a particular destination or waypoint (e.g., a destination identified by GPS coordinates). In one or more embodiments, the memory device 216 of the UAV system 100 may contain a new path planning algorithm which, when executed by the processor 217, cause the processor 217 to compute the flight path of the UAV system 100 for sampling visually with the camera 500 and with the SONAR device 400 and to then follow that computed flight path. That is, in one or more embodiments, the UAV system 100 may include instructions stored in the memory device 216 which, when executed by the processor 217, cause the UAV system 100 to autonomously navigate to a desired destination (e.g., a disaster area) and/or survey an area.

In the illustrated embodiment, the method 800 also includes a task 820 of photographing an area (e.g., the topology over which the UAV system 100 is flying) with the camera 500 during the task 810 of navigating the UAV system 100 (e.g., the task 820 may include capturing one or more thermal images utilizing the IR camera and/or one or more visible light images utilizing the EO camera).

In the illustrated embodiment, the method 800 also includes a task 830 of collecting weather data (i.e., atmospheric data) with the weather station 600 during the task 810 of navigating the UAV system 100 (e.g., the task 830 may include collecting data regarding wind speed and direction, temperature, relative humidity, and atmospheric pressure). In one or more embodiments, the task 830 may also include associating the atmospheric conditions measured by the weather station 600 (e.g., wind speed and direction, temperature, relative humidity, and atmospheric pressure) with the position, altitude, and heading of the UAV system 100.

In one or more embodiments, the method 800 also includes a task 840 of landing the UAV system 100 on a body of water. As described above, the elongated floats 303 of the landing gears 301, 302 provide buoyancy that enable the UAV system 100 to float on the body of water.

In the illustrated embodiment, the method 800 also includes a task 850 of scanning the body of water with the SONAR device 400 while the UAV system 100 is floating on the body of water. During task 850, the transducer 401 (e.g., the 360-degree transducer) and the depth finder 402 of the SONAR device 400 may be utilized to map the underwater topology of the body of water (e.g., a channel, a river, a lake, or the ocean shore) on which the UAV system 100 is floating. In one or more embodiments in which the SONAR device 400 is (or includes) a 360-degree SONAR system, the 360-degree SONAR system enables imaging of a conical area below the SONAR device 400 while the UAV system 100 is stationary or substantially stationary on the surface of the water (i.e., the use of a 360-degree SONAR system enables imaging of a conical area below the SONAR device 400 without requiring the UAV system 100 to traverse along the surface of the water). The underwater topological map of a body of water, such as a river or a creek, may be utilized to estimate the water carrying capacity of the body of water, which may be used to plan for and respond to flooding events (e.g., the underwater topological map may be utilized to perform pre-disaster mitigation (PDM) accurately predicting flooding before the occurrence of a natural disaster, and/or it may be used to confirm that flooding events are following those predictions or determining why the carrying capacity of the river or the creek is not sufficient). The underwater topological map may be used in conjunction with conventional digital elevation maps (DEMs) generated by high altitude aircraft.

Additionally, in the illustrated embodiment, the method 800 also includes a task 860 of propelling the UAV system 100 along the surface of the body of water. The task 860 may be performed utilizing the secondary propulsion system 700 of the UAV system 100. In operation, when the UAV system 100 is floating on a body of water (e.g., due to the buoyancy of the elongated floats 303), the motor 701 drives the pump 702 to draw in water (from the body of water on which the UAV system 100 is floating) through the inlet port 311 in the lower shell 305 of the elongated float 303. The pump 702 then discharges the water through the through the exit nozzle 704 and the outlet port 312 in the elongated float 303. In this manner, the secondary propulsion system 700 is configured to propel the UAV system 100 along the surface of the water. During task 860, the UAV system 100 may be steered by differentially driving the secondary propulsion systems 700 in the landing gears 301 and 302. For instance, performing a left-hand turn may include operating the secondary propulsion system 700 in the right landing gear 301 and not operating the secondary propulsion 700 in the left landing gear 302, or operating the secondary propulsion system 700 in the right landing gear 301 at a higher power level than the secondary propulsion system 700 in the left landing gear 302. Similarly, performing a right-hand turn may include operating the secondary propulsion system 700 in the left landing gear 302 and not operating the secondary propulsion 700 in the right landing gear 301, or operating the secondary propulsion system 700 in the left landing gear 302 at a higher power level than the secondary propulsion system 700 in the right landing gear 301.

Propelling the UAV system 100 along the surface of the water in task 860 enables, for example, the UAV system 100 to perform side-scan imaging using the side-scan transducer 401 of the SONAR device 400. Accordingly, in one or more embodiments, the method 800 may include performing the task 850 with the side-scan transducer 401 of the SONAR device 400 during the task of propelling the UAV system 100 along the surface of the body of water. That is, in one or more embodiments in which the SONAR device 400 is (or includes) a side-scan SONAR system, the secondary propulsion system 700 of the UAV system 100 may be activated to cause the UAV system 100 to traverse along the surface of the water while the side-scan SONAR system (i.e., the side-scan transducer) scans the body of water. The side-scan SONAR device is configured to generate underwater bathymetric maps and high-definition mosaics of the body of water.

Figures 6A, 6B, 6C, 6D:
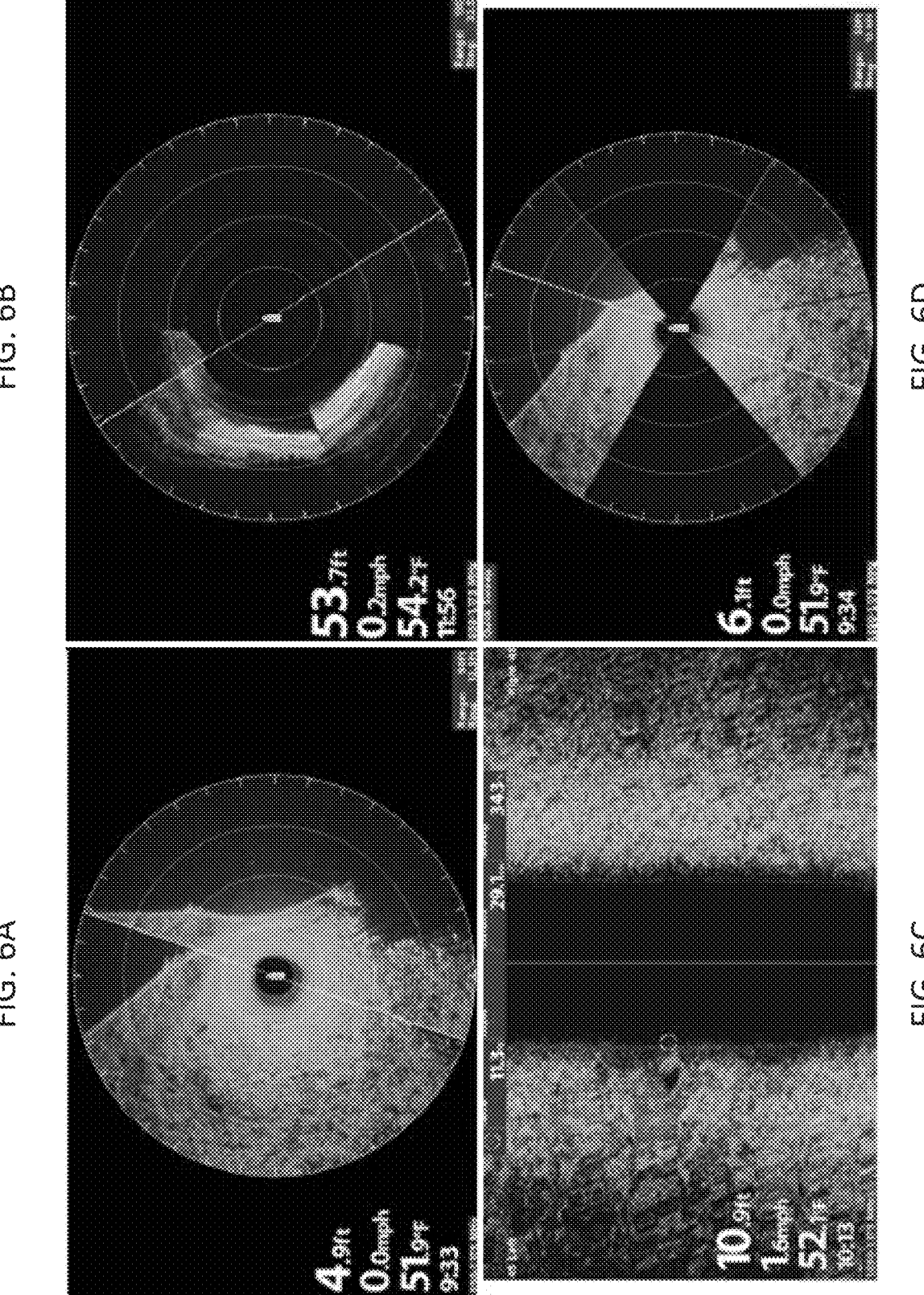
FIGS. 6A-6D are a 360-degree SONAR image generated in shallow water, a deep-water image, a side-scan image, and a 360-degree quick sweep SONAR image, respectively, generated by the unmanned aerial system according to one embodiment of the present disclosure.

FIG. 6A is a 360-degree SONAR image generated by the SONAR device 400 while the unmanned aerial vehicle is floating on the surface of shallow water having a depth of approximately 4.9 ft and while the UAV system 100 is stationary on the surface of the water (0.0 mph). FIG. 6B is a 360-degree SONAR image generated by the SONAR device 400 while the UAV system 100 is floating on the surface of relatively deep water having a depth of approximately 53.7 ft and while the UAV system 100 is substantially stationary on the surface of the water (0.2 mph). FIG. 6C is a side-scan SONAR image generated by the SONAR device 400 while the UAV system 100 is floating on the surface of shallow water having a depth of approximately 10.9 ft and while the UAV system 100 is traversing along the surface of the water at a speed of approximately 1.6 mph. FIG. 6D is a 360-degree quick sweep SONAR image generated by the SONAR device 400 while the UAV system 100 is floating on the surface of shallow water having a depth of approximately 6.1 ft and while the UAV system 100 is stationary on the surface of the water (0.0 mph).

In the illustrated embodiment, the method 800 also includes a task 870 of determining and/or identifying one or more things of interest, such as debris, underwater structures, waterway obstructions, victims, and/or survivors. In one or more embodiments, the memory device 216 of the UAV system 100 may contain instructions which, when executed by the processor 217, cause the processor 217 to identify and/or classify objects detected by the camera 500 and/or the SONAR device 400 of the UAV system 100 utilizing artificial intelligence (e.g., machine learning and/or computer vision). For instance, in one or more embodiments, the instructions, when executed by the processor 217, cause the processor 217 to identify humans in the images captured by the camera 500 (e.g., a thermal image captured by the IR camera and/or a visible light image captured by the EO camera), and/or to identify debris, underwater structures, and/or other waterway obstructions in the underwater scan data captured by the SONAR device 400 (e.g., the memory device 216 may include an artificial neural network configured to perform semantic segmentation of the images captured by the camera 500 and/or the underwater scan data captured by the SONAR device 400 to identify humans, casualties, debris, underwater structures, and/or other waterway obstructions).

Additionally, in one or more embodiments, the method 800 includes a task 880 of calculating or determining the water carrying capacity of the body of water utilizing the information obtained in task 820 and/or task 850. In one or more embodiments, the memory device 216 of the UAV system 100 may contain a flood prevention algorithm which, when executed by the processor 217, causes the processor 217 to compute the water carrying capacity of a body of water (e.g., a river, a bayou, or a shallow littoral area). In one or more embodiments, the flood prevention algorithm, when executed by the processor 217, causes the processor 217 to construct or reconstruct a bathymetric map showing the underwater topology of the body of water based on the data collected by the SONAR device 400. The flood prevention algorithm may utilize deep learning to reduce noise and to fuse the sonar data collected by the SONAR device 400 at different water conditions into a three-dimensional underwater map. In one or more embodiments, the flood prevention algorithm, when executed by the processor 217, may cause the processor 217 to utilize the bathymetric map in conjunction with topological information from digital elevation maps (DEMs) and/or visual overlays (e.g., information regarding the slope of a waterway bank, the presence of vegetation that might retain water, and/or the presence of pavement that increases runoff). The terrestrial DEM and/or the visual overlays may be collected or generated utilizing the camera 500 of the UAV system 100 (e.g., utilizing standard open-source computer vision photogrammetric packages) or the terrestrial DEM may be an existing DEM gathered by another aircraft. The flood prevention algorithm, when executed by the processor 217, may cause the processor 217 to combine the terrestrial DEM with the underwater bathymetric map to produce a comprehensive volumetric map suitable for computing the carrying capacity of the waterway.

In this manner, the UAV system 100 may be utilized in disaster relief operations, such as damage assessment (e.g., underwater damage assessment and/or assessment of waterway structures, such as bridges and piers), victim identification (e.g., searching for displaced populations and/or individuals), and identification of safe pathways for ships or boats to navigate while delivering needed supplies and/or performing rescue missions. For instance, the UAV system 100 may be utilized to assist and provide situational awareness to first responder teams in natural disaster relief missions, rescue missions, and/or humanitarian efforts. Moreover, the UAV system 100 may be utilized to survey locations that are inaccessible by land vehicles, for example, due to damaged and/or obstructed roadways, and inaccessible by maritime vessels, for example, due to obstructed channels, ports, or other waterways. Furthermore, in one or more embodiments, the UAV system 100 may be utilized in tailing ponds, which are a common by-product of the hard rock mining process. In order to extract valuable resources, ore is pulverized and processed with concentrated chemical reactions. An aqueous solution of this processed powder is then deposited into a large open pond. The fine powder dispersed at the tailing ponds hinders personnel from safely performing government-mandated water geographical tests. Many devices have been tried over the years to accomplish government mandated testing at these sites, however harsh environments and the inability to physically reach a downed vessel can prevent these tests from being carried out by conventional methods. However, the UAV system 100 of the present disclosure is impervious to the trapping effects mine pools have on water vessels and it provides a long-range solution to allow the operator to maintain a safe distance from the testing location.

While this invention has been described with particular references to embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention. Additionally, although relative terms such as "horizontal," "vertical," "upper," "lower," and similar terms have been used herein to describe a spatial relationship of one element to another, it is to be understood that these terms are intended to encompass different orientations of the various elements and components of the invention in addition to the orientation depicted in the figures. Additionally, as used herein, the terms "substantially," "about," and similar terms are used as terms of approximation and not as terms of degree, and are intended to account for the inherent deviations in measured or calculated values that would be recognized by those of ordinary skill in the art. Furthermore, as used herein, when a component is referred to as being "on" or "coupled to" another component, it can be directly on or attached to the other component or one or more intervening components may be present therebetween.

What is claimed is:

1. An unmanned aerial system comprising:
an unmanned aerial vehicle comprising:
a body; and
a primary propulsion system coupled to the body, the primary propulsion system comprising at least one propeller and at least one motor coupled to the at least one propeller;
a pair of landing gears coupled to the body of the unmanned aerial vehicle, each landing gear of the pair of landing gears comprising a buoyant elongated float;
a secondary propulsion system coupled to the pair of landing gears, the secondary propulsion system comprising a pump comprising an exit nozzle, and a motor coupled to the pump;
a SONAR device coupled to the unmanned aerial vehicle; and
a memory device coupled to the unmanned aerial vehicle and configured to contain a flight path planning algorithm and/or instructions for identifying and/or classifying objects detected by the SONAR device,
wherein the unmanned aerial system is configured to generate a SONAR image while stationary on a surface of a body of water and while traversing along the surface of the body of water.

2. The unmanned aerial system of claim 1, wherein the SONAR device comprises a 360-degree transducer and a side-scan transducer.

3. The unmanned aerial system of claim 2, wherein the SONAR device further comprises a depth finder.

4. The unmanned aerial system of claim 1, further comprising a camera coupled to the body of the unmanned aerial vehicle.

5. The unmanned aerial system of claim 4, wherein the camera is a high-definition electro-optical (EO) camera or an infra-red (IR) camera.

6. The unmanned aerial system of claim 1, wherein each elongated float comprises an interior cavity comprising a forward compartment and an aft compartment, an inlet port and an outlet port in fluid communication with the aft compartment, and wherein the forward compartment houses the motor and the aft compartment houses the pump.

7. The unmanned aerial system of claim 1, further comprising a weather station coupled to the unmanned aerial vehicle.

8. The unmanned aerial system of claim 7, wherein the weather station comprises at least one sensor selected from the group consisting of an anemometer, a thermistor, a hygrometer, a barometer, a pyranometer, and combinations thereof.

9. The unmanned aerial system of claim 1, wherein the body defines an interior chamber comprising a plurality of compartments.

10. The unmanned aerial system of claim 9, further comprising:
a flight controller in one compartment of the plurality of compartments; and
at least one rechargeable battery in a compartment of the plurality of compartments.

11. The unmanned aerial system of claim 1, wherein each landing gear further comprises a skeg or at least one retractable foot.

12. The unmanned aerial system of claim 1, wherein the pair of landing gears are detachable from the body.

13. The unmanned aerial system of claim 1, wherein the pair of landing gears are configured to move between a deployed configuration and a stowed configuration.

14. The unmanned aerial system of claim 1, wherein the secondary propulsion system is configured to propel the unmanned aerial vehicle along the surface of the body of water while the SONAR device scans the body of water.

15. The unmanned aerial system of claim 1, further comprising at least one rechargeable battery connected to and configured to supply power to the motor of the secondary propulsion system.

16. An unmanned aerial system comprising:
an unmanned aerial vehicle comprising:
a body; and
a primary propulsion system coupled to the body;
a pair of landing gears coupled to the body, each landing gear of the pair of landing gears comprising a buoyant elongated float;
a secondary propulsion system coupled to the pair of landing gears, the secondary propulsion system comprising a pump comprising an exit nozzle, and a motor coupled to the pump;
a SONAR device coupled to the unmanned aerial vehicle;
a camera coupled to the body of the unmanned aerial vehicle;
a weather station coupled to the body of the unmanned aerial vehicle; and
a memory device coupled to the unmanned aerial vehicle and configured to contain a flight path planning algorithm and/or instructions for identifying and/or classifying objects detected by the SONAR device and/or the camera,
wherein the unmanned aerial system is configured to generate a SONAR image while stationary on a surface of a body of water and while traversing along the surface of the body of water.

17. A method of surveying an environment, the method comprising:
landing an unmanned aerial vehicle on a surface of a body of water;
propelling the unmanned aerial vehicle along the surface of the body of water using a propulsion system of the unmanned aerial vehicle, the propulsion system comprising a pump comprising an exit nozzle, and a motor coupled to the pump; and
scanning the body of water with a SONAR device of the unmanned aerial vehicle to generate an underwater topological map of the body of water,
wherein a memory device of the unmanned aerial vehicle is configured to contain a flight path planning algorithm and/or instructions for identifying and/or classifying objects detected by the SONAR device, and wherein the unmanned aerial vehicle is configured to generate a SONAR image while stationary on the surface of the body of water and while traversing along the surface of the body of water.

18. The method of claim 17, further comprising capturing a photograph with a camera of the unmanned aerial vehicle.

19. The method of claim 17, further comprising collecting weather data with a weather station of the unmanned aerial vehicle.

20. The method of claim 17, wherein the scanning the body of water comprises side-scanning and 360-degree imaging the water with the SONAR device.

21. The method of claim 17, wherein the propelling the unmanned aerial vehicle along the surface of the body of water is performed while the body of water is scanned with the SONAR device.

\* \* \* \* \*